United States Patent
Hayashi et al.

(10) Patent No.: US 6,944,439 B2
(45) Date of Patent: Sep. 13, 2005

(54) APPARATUS FOR CALL ADMISSION CONTROL BASED ON TRANSMISSION POWER OF BASE STATION

(75) Inventors: Takahiro Hayashi, Yokosuka (JP); Yoshihiro Ishikawa, Yokosuka (JP); Seizo Onoe, Yokohama (JP); Takehiro Nakamura, Yokosuka (JP); Mikio Iwamura, Zushi (JP); Yoshiaki Ofuji, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 392 days.

(21) Appl. No.: 10/067,945

(22) Filed: Feb. 8, 2002

(65) Prior Publication Data

US 2002/0115427 A1 Aug. 22, 2002

(30) Foreign Application Priority Data

Feb. 9, 2001 (JP) ..................................... 2001-034304

(51) Int. Cl.[7] .............................................. H04M 1/66
(52) U.S. Cl. .................... 455/411; 455/410; 370/395.2
(58) Field of Search ................................ 455/410, 411, 455/412.1–2, 452, 453, 346, 525, 67.11, 435.1–3, 5, 419.1; 370/230, 237, 395.2–21, 330–337, 252, 349

(56) References Cited

U.S. PATENT DOCUMENTS

| | | | | |
|---|---|---|---|---|
| 5,838,671 A | * | 11/1998 | Ishikawa et al. | ............ 370/335 |
| 5,943,610 A | * | 8/1999 | Endo | ............................ 455/69 |
| 6,628,732 B1 | * | 9/2003 | Takaki | ......................... 375/345 |
| 6,801,515 B1 | * | 10/2004 | Ishikawa et al. | ............ 370/342 |
| 2005/0054382 A1 | * | 3/2005 | Boettcher et al. | ............ 455/561 |

FOREIGN PATENT DOCUMENTS

| | | |
|---|---|---|
| CN | 1146700 | 4/1997 |
| EP | 0 817 521 | 1/1998 |
| EP | 1 100 283 | 5/2001 |
| GB | 2 343 331 | 5/2000 |
| GB | 2 347 317 | 8/2000 |
| JP | 8-191481 | 7/1996 |
| WO | WO 98/30047 | 7/1998 |
| WO | WO 99/09767 | 2/1999 |
| WO | WO 00/35235 | 6/2000 |
| WO | WO 01/35692 | 5/2001 |
| WO | WO 01/93620 | 12/2001 |

OTHER PUBLICATIONS

S. Sun, et al., Vehicular Technology Conference, VTC 98, pp. 218–223, XP–010287805, "Call Admission Policies and Capacity Analysis of a Multi–Service CDMA Personal Communication System With Continuous and Discontinuous Transmission", May 18, 1998.

B. Hjelm, Vehicular Technology Conference, VTC 2000–Fall, pp. 1086–1093, XP–000988548, "Admission Control in Future Multi–Service Wideband Direct–Sequence CDMA Systems", Sep. 24, 2000.

* cited by examiner

*Primary Examiner*—CongVan Tran
(74) *Attorney, Agent, or Firm*—Oblon, Spivak, McClelland, Maier & Neustadt, P.C.

(57) ABSTRACT

An apparatus for controlling call admission, comprising a call admission check unit which determines whether to admit a call in response to reception of the call based on a threshold that reflect history of base station transmission power.

13 Claims, 9 Drawing Sheets

*DYP=DYPLEXER

APPARATUS FOR CALL ADMISSION CONTROL BASED ON TRANSMISSION POWER OF BASE STATION

BACKGROUND OF THE INVENTION

1. Field of the Invention

The present invention generally relates to a method of controlling calls in a mobile communication system, and particularly relates to a method of controlling calls when a base station receives calls from a plurality of mobile stations. The present invention further relates to a base station which attends to communication based on such a method of controlling calls.

2. Description of the Related Art

In mobile communication systems, the number of simultaneously connectable users (hereinafter referred to as "capacity") differs depending on employed wireless access schemes. In a mobile communication system using FDMA (frequency division multiple access) as a wireless access scheme, for example, capacity is determined by a frequency band occupied per user and a frequency band available to the system. If the wireless access scheme is TDMA (time division multiple access), capacity is determined by the number of timeslots that are the unit of division used for time division. If the wireless access scheme is code division multiple access such as CDMA, capacity is determined by electric power occupied by each user and the amount of interference between users. Factors that determine the capacity of the CDMA scheme include the number of codes that can be allocated, the amount of interference on the uplink, and the transmission power on the downlink. The amount of interference differs depending on the characteristics of employed codes. In any event, the capacity basically corresponds to a point at which the total of user electric power exceeds a certain limit.

Figure 9:
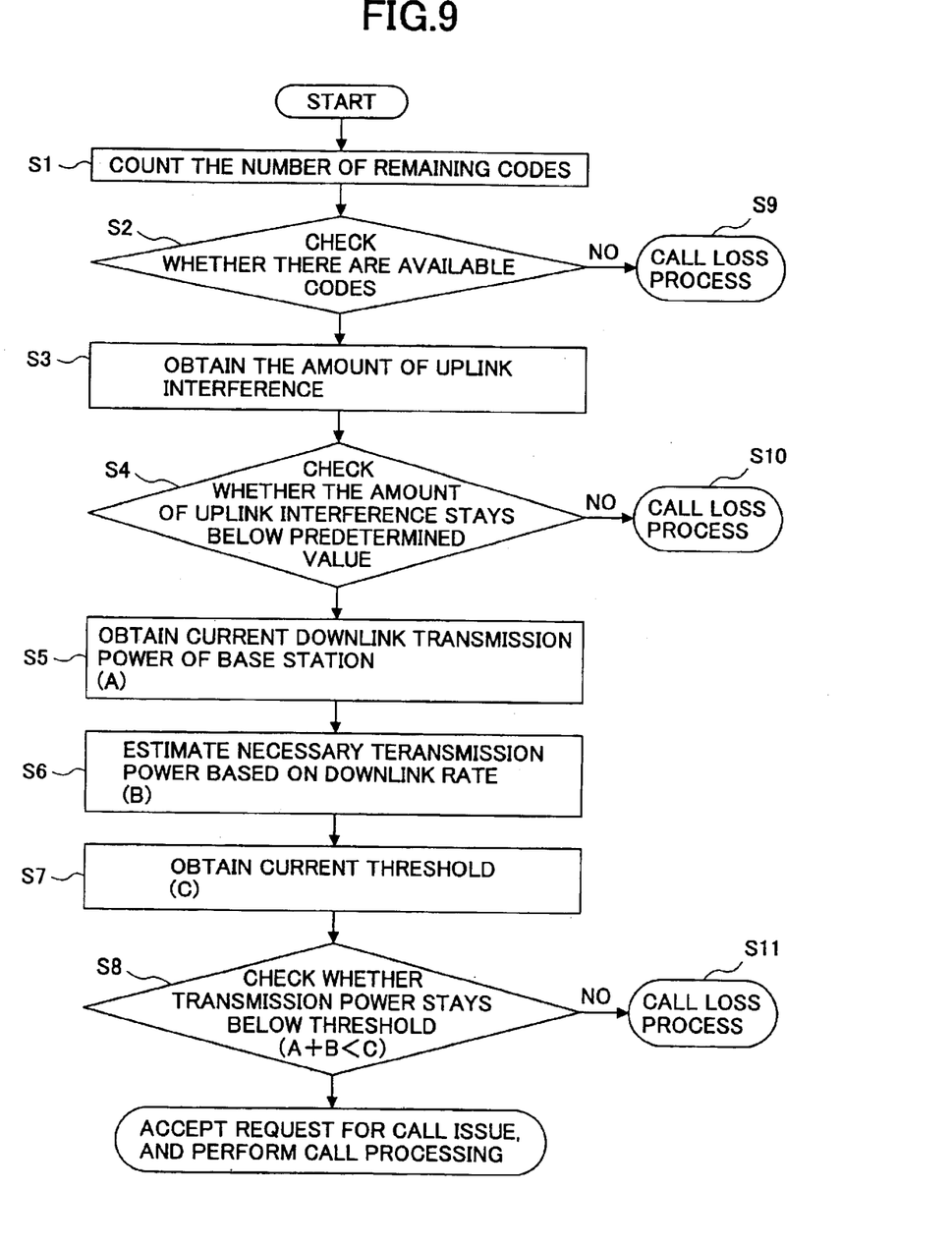
FIG. 9 is a flowchart of a procedure for call reception operation performed by a related-art base station.

Normally, a base station used in a mobile communication system accepts calls from mobile stations (i.e., from users) by taking into account the capacity that is determined as described above. The call admission operation performed by the base station is carried out by following a procedure as shown in FIG. 9, for example. In this description relating to FIG. 9, the base station is assumed to be employing the CDMA scheme.

In FIG. 9, upon receiving a call from a mobile station, the base station checks whether there are available codes that can be allocated (S2). If the check finds that there are available codes (YES at S2), a check is further made as to whether the amount of uplink interference stays below a predetermined amount (S4). If the check finds that the amount of uplink interference stays below the predetermined amount (YES at S4), a further check is made as to whether a sufficient transmission power is left in the base station, i.e., whether the transmission power of the base station stays below a threshold (S8). If the check finds that the transmission power of the base station stays below the threshold (YES at S8), a call setting process is performed for the call that has been received. If any one of the checks (S2, S4, S8) does not satisfy the required conditions, a call loss process is carried out (S9, S10, S11).

Figure 10A:
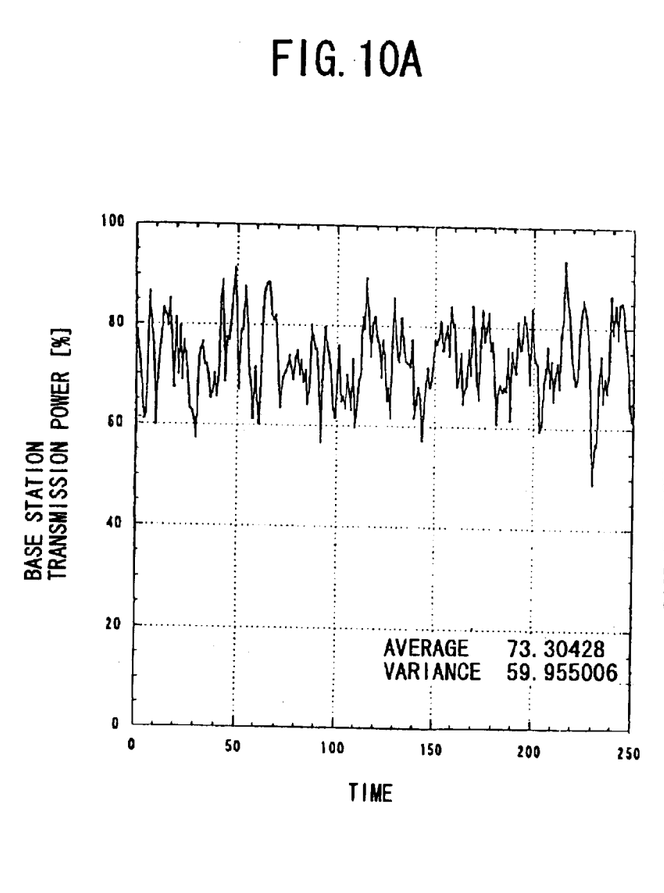
FIGS. 10A and 10B are charts showing temporal shifts in base station transmission power.
Figure 10B:
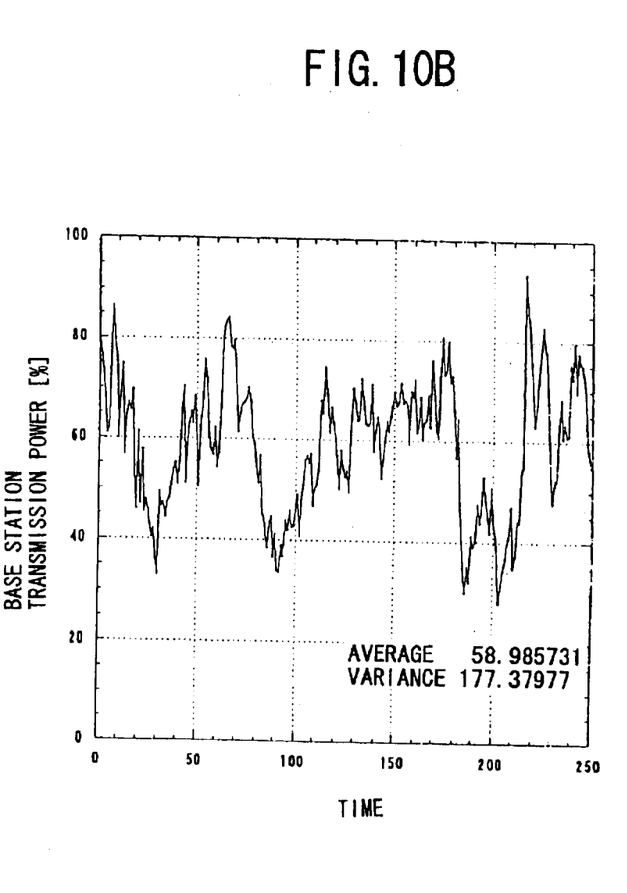

FIGS. 10A and 10B are charts showing temporal shifts in the base station transmission power.

FIG. 10A shows a temporal shift of base station transmission power in a case where calls based on communication through circuit switching are exclusively connected to the base station. FIG. 10B shows a temporal shift of the base station transmission power in a case in which calls of circuit switching and calls of packet switching are mixed and connected to the base station. In FIGS. 10A and 10B, a horizontal axis represents time, and a vertical axis represents a base station transmission power (%). In this example, the number of simultaneously connected calls is assumed to be 25, and the powers of all the connected users are added to the total. In FIG. 10A and FIG. 10B, an average and a variance of the base station transmission power computed over time 0 through time 250 are shown at the bottom right portion.

As shown in FIG. 10A, where calls of circuit switching are solely connected, the waveform of the base station transmission power does not exhibit extreme changes. Where calls of circuit switching and packet switching are mixed, as shown in FIG. 10B, the waveform of the base station transmission power exhibits volatile changes. This is because the transmission of packet switching calls is performed in a burst-like manner. That is, transmission is made when data is present, and stops when no data is present, such intermittent nature of transmission causing the volatile changes.

As described above, among various checks that have to be made in the base station in response to reception of a call, the number of available codes that can be allocated (i.e., the check at S2 of FIG. 9) is determined by the number of currently connected users. It is safe to assume that no mistake occurs in counting the number of available codes. The amount of uplink interference and the transmission power of a base station, however, may exhibit volatile changes depending on the conditions of connected calls as shown in FIGS. 10A and 10B. For example, even if a sufficient transmission power remains at the time of detection of the base station transmission power (at S5 of FIG. 9), it is possible to end up accepting an excessive number of calls unless calls are accepted by taking into account the types of currently connected calls (i.e., whether calls of circuit switching or calls of packet switching). It is possible that a large number of packet switching calls have been already connected but happen to be currently inactive when the base station accepts further calls. In such a case, the base station transmission power may become insufficient.

Accordingly, there is a need for a call admission control apparatus and a base station which accept calls without degrading communication quality by monitoring the transmission power levels properly.

SUMMARY OF THE INVENTION

It is a general object of the present invention to provide a call admission control apparatus and a base station that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a call admission control apparatus and a base station particularly pointed out in the specification in such full, clear, concise, and exact terms as to enable a person having ordinary skill in the art to practice the invention.

To achieve these and other advantages and in accordance with the purpose of the invention, as embodied and broadly described herein, an apparatus for controlling call admission includes a call admission check unit which determines whether to admit a call in response to reception of the call based on a threshold that reflect history of base station transmission power.

The apparatus described above monitors history of changes of base station transmission power, thereby making it possible to estimate types of calls connected to the base station based on the monitored changes. The threshold providing a basis for a call admission check can then be determined by using such estimate. Use of the threshold obtained in this manner makes it possible to achieve proper call admission without degrading communication quality of currently connected calls.

According to one aspect of the present invention, the apparatus as described above further includes an averaging unit which obtains an average of past samples of the base station transmission power, wherein said call admission check unit determines whether to admit the call by comparing a threshold with a sum of the average of past samples and transmission power required for the call.

In the apparatus as described above, the past samples of the base station transmission power are averaged over a predetermined time period. This averaging process makes it possible to estimate the presence of potential packet switching calls. When transmissions of packet switching calls were present but are currently inactive, for example, an averaged value is relatively high even though the instantaneous value of the current base station transmission power may be relatively low. In this case, therefore, it is ascertained that there are some packet switching calls currently on the line.

In this manner, use of an average of base station transmission power for the call admission check makes it possible to achieve reliable call admission.

According to one aspect of the present invention, the apparatus as described above further includes a packet-switching-call-proportion estimating unit which estimates a proportion of packet switching calls in a total number of calls based on past samples of the base station transmission power, wherein the threshold reflects the estimated proportion.

The apparatus as described above obtains an estimate of a proportion of packet switching calls in a total number of calls currently connected to the base station by monitoring the past samples of the base station transmission power. The apparatus makes the threshold for a call admission check reflect this estimate, and will be less likely to admit further calls if the estimate indicates the presence of potential packet switching calls despite the presence of some margin of the base station transmission power. This makes it possible to avoid a situation in which an excessive number of calls are accepted.

According to one aspect of the present invention, the apparatus as described above is such that said packet-switching-call-proportion estimating unit measures a volatility of the base station transmission power as the estimated proportion over a predetermined time period.

The apparatus described above measures the volatility of the base station transmission power, thereby making it possible to estimate a proportion of packet switching calls in a total number of calls currently connected to the base station. If the volatility of base station transmission power is large, it is ascertained that there are potential packet switching calls. If the volatility of base station transmission power is small, it is ascertained that stable circuit switching calls are predominant.

According to one aspect of the present invention, the apparatus as described above further includes a threshold computation unit which computes the threshold concerning a present instant by adjusting the threshold concerning a previous instant in response to the measured volatility and by placing the threshold concerning the present instant within a tolerance range if the threshold concerning the present instant falls outside a tolerance range.

The apparatus described above dynamically updates the threshold of the call admission check. If the variance (i.e., measured volatility) is larger than before, potential packet switching calls are expected to be present. In this case, the threshold is decreased to provide a new threshold. If the variance is smaller than before, it is estimated that circuit switching calls are predominant, with the number of potential packet switching calls being small. In this case, the threshold is increased from a previous threshold.

In this manner, the correction of a threshold is dynamically performed in response to measured volatility. Use of such threshold for the call admission check makes it possible to achieve efficient call admission that takes into account the presence of potential packet switching calls. Since provision is made to prevent the threshold from exceeding beyond the tolerance range, it is possible to avoid accepting calls that will result in overload.

According to one aspect of the present invention, the apparatus as described above further includes a memory unit which stores therein a table of volatilities and associated thresholds, and a threshold computation unit which obtains the threshold by referring to the table and finding in the table a threshold associated with the volatility measured by said packet-switching-call-proportion estimating unit.

In the apparatus as described above, the volatilities and associated thresholds are stored in a table format. When the measured volatility is given, the apparatus will consult the table and readily find a threshold that corresponds to the measured volatility.

According to one aspect of the present invention, the apparatus further includes a threshold computation unit which determines the threshold concerning a present instant by adjusting the threshold concerning a previous instant in response to whether compression is present or absent in multiplexing base-band signals.

In the apparatus as described above, the threshold is dynamically updated in response to the detection of compression in the base-band signal multiplexing unit of the base station. If compression is detected in the base-band signal multiplexing unit, this means that only a small amount of transmission power remains. If this is the case, the threshold is decreased so as to reduce the possibility of accepting further calls. If no compression is detected in the base-band signal multiplexing unit, it is ascertained that there is still a margin of the transmission power. In this case, the threshold is increased. In this manner, the detection of compression in the base-band signal multiplexing unit allows an estimate to be made with respect to the calls currently connected to the base station.

According to one aspect of the present invention, the apparatus as described above further includes a peak-hold unit which obtains a peak of the base station transmission power within a predetermined period, wherein said call admission check unit determines whether to admit the call by comparing a threshold with a sum of the peak and transmission power required for the call.

In the apparatus as described above, it is possible to properly appraise a margin of the base station transmission power by monitoring the peak of the base station transmission power even when the transmission power of currently connected calls happens to exhibit a simultaneous surge.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
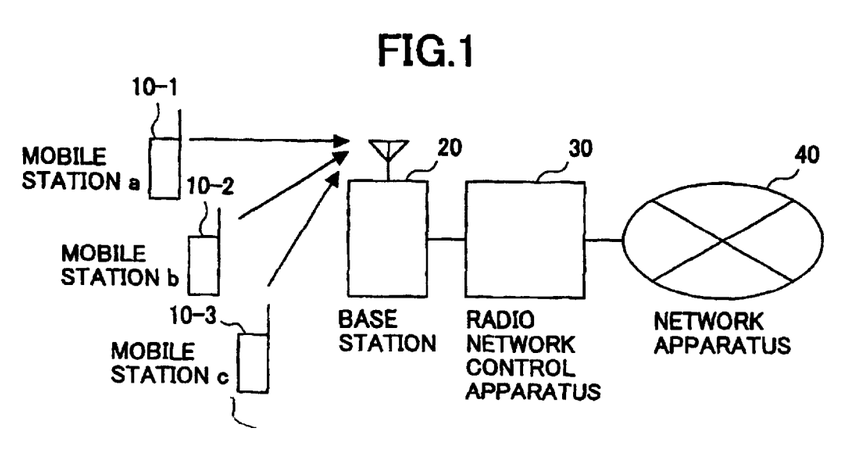
FIG. 1 is an illustrative drawing showing a mobile communication system to which an embodiment of a call control method according to the present invention is applied.

FIG. 1 is an illustrative drawing showing a mobile communication system to which an embodiment of a call control method according to the present invention is applied.

In FIG. 1, the mobile communication system is based on the CDMA (code division multiple access) scheme, and includes mobile stations (e.g., portable telephone sets) 10-1 through 10-3, a base station 20, a radio network control apparatus 30, and a network apparatus (e.g., switch station apparatus) 40. The mobile stations 10-1 through 10-3 communicate with the base station 20 through radio, and can attend to audio communication or non-audio communications with other terminals (such as portable telephone sets) through the radio network control apparatus 30 and the network apparatus 40.

Figure 2:
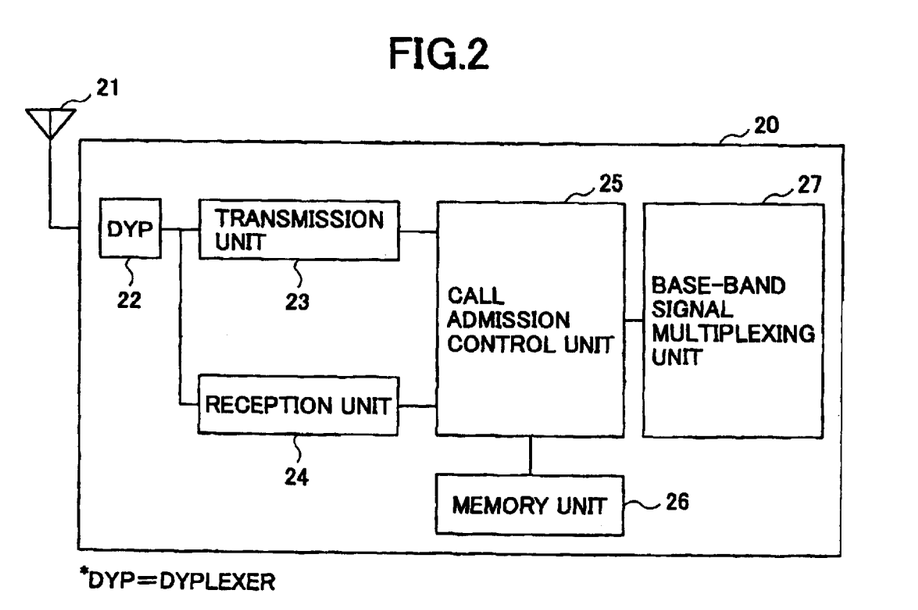
FIG. 2 is a block diagram showing an example configuration of a base station.

FIG. 2 is a block diagram showing an example configuration of the base station 20.

In FIG. 2, the base station 20 includes an antenna 21 for receiving radio frequency signals, a dyplexer 22 for separating transmission signals and reception signals, a transmission unit 23 for modulating and amplifying transmission signals, a reception unit 24 for demodulating reception signals, a call admission control unit 25 for performing call control such as the admission of issued calls and the reception of calls with respect to the mobile stations 10-1 through 10-3, a memory unit 26 for storing information about a threshold for accepting calls, and a base-band signal multiplexing unit 27 for processing and multiplexing base-band signals. The call admission control unit 25 receives a call setting request from a user through the reception unit 24, and, then, performs a call admission check process that checks whether this call can be accepted. This call admission check process is carried out by comparing a predetermined reference value with a sum of the transmission power of the base station 20 and the transmission power required for the call to be accepted. If the check finds that the call can be admitted, the call admission control unit 25 sends a call setting admission message to the user, thereby setting up a link.

In this manner, the call admission control unit 25 of the base station 20 carries out a call admission check in response to reception of a call from a user.

Figure 3:
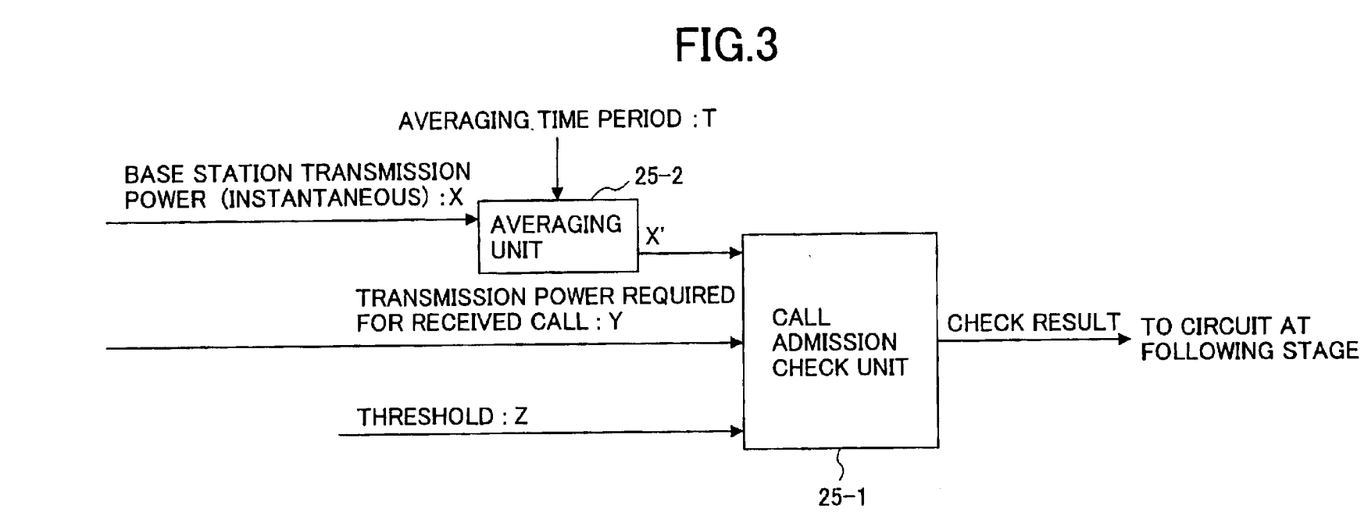
FIG. 3 is a block diagram showing an example configuration of a call admission control unit.

FIG. 3 is a block diagram showing an example configuration of the call admission control unit 25.

In FIG. 3, the call admission control unit 25 includes a call admission check unit 25-1 and an averaging unit 25-2. The averaging unit 25-2 performs a predetermined averaging process by use of an instantaneous value X of the transmission power of the base station 20. The call admission check unit 25-1 checks whether to accept the call by comparing a predetermined check reference Z (i.e., threshold) with a sum of an averaged transmission power X' obtained by the averaging unit 25-2 and a transmission power Y required for the received call. If X'+Y<Z, the call admission check unit 25-1 accepts the call. Otherwise, the call is rejected.

In the following, a first embodiment of the present invention will be described with reference to FIG. 3.

In FIG. 3, if the instantaneous value of the transmission power X of the base station 20 is used as it is, the call admission check unit 25-1 will be susceptible to the volatility of the base station transmission power X. In consideration of this, the present invention provides the averaging unit 25-2 for averaging the transmission power X in order to alleviate the volatility. The averaging unit 25-2 is given an averaging time T as an operation parameter. The averaging unit 25-2 stores therein the record of transmission power of the base station 20 over the past time period T, and supplies an averaged value X' to the call admission check unit 25-1. Provision of the averaged value X' to the call admission check unit 25-1 can alleviate the effect of volatility of the base station transmission power X. Further, such an averaging process insures that an averaged value is relatively high when transmissions of packet switching calls were present but are currently inactive, even though the instantaneous value of the current base station transmission power may be relatively low. As a result, the presence of potential packet switching calls can be reflected by the admission check. The averaging time T for the averaging process needs to be set by taking into account the intervals of intermittent transmissions of packet switching calls when keeping record of the transmission history. For example, if an average of a transmission lasting length of a packet switching call is 10 seconds, and an average of a no-transmission interval period is 20 seconds, the period T may be set to about 30 seconds.

In this embodiment, the averaging unit 25-2 may obtain a median of the past samples rather than an average of the past samples, or may obtain a center of the past samples.

Figure 4:
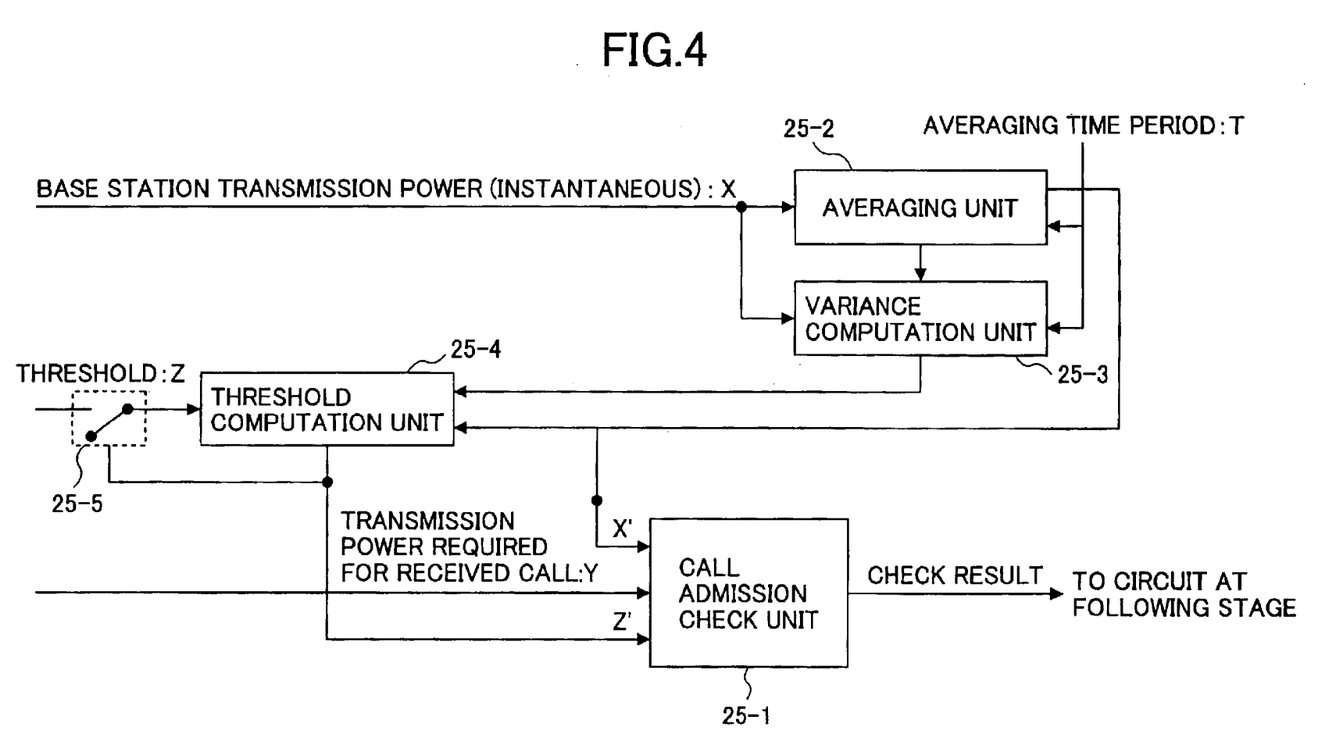
FIG. 4 is a block diagram showing another example configuration of the call admission control unit.

FIG. 4 is a block diagram showing another example configuration of the call admission control unit 25.

In FIG. 4, the call admission control unit 25 includes a variance computation unit 25-3 and a threshold computation unit 25-4 in addition to the configuration of FIG. 3. Further, a switch 25-5 is provided at a stage prior to the threshold computation unit 25-4. The switch 25-5 can switch between a line carrying the threshold Z of an initial state and a line for feeding back a value computed by the threshold computation unit 25-4. The call admission check unit 25-1 receives the value X' computed by the averaging unit 25-2, the transmission power Y required by the received call, and the output Z' of the threshold computation unit 25-4. How to check admission in the call admission check unit 25-1 is the same as in the previous case.

In the following, a second embodiment of the present invention will be described with reference to FIG. 4.

In FIG. 4, the averaging unit 25-2 and the variance computation unit 25-3 are provided with the averaging time T as an operation parameter. The averaging unit 25-2 computes an average of the base station transmission power over the past time period T, and supplies the computed value to the call admission check unit 25-1 and the variance computation unit 25-3 The variance computation unit 25-3 uses the average value supplied from the averaging unit 25-2 to compute a variance of sampled values over the past time period T, and supplies the computed result to the threshold computation unit 25-4. The threshold computation unit 25-4 computes a new threshold based on the variance supplied from the variance computation unit 25-3.

According to the embodiment described above, an average and variance of the base station transmission power are obtained, and a threshold used in the call admission check is computed based on the variance so as to be dynamically updated. If the call admission check is made by use of such a threshold, call admission should be made properly without overlooking the existence of potential packet switching calls.

In this embodiment, a standard deviation may be used in place of a variance, or any other measure of volatility regarding the past samples of base station transmission power may be used. Use of such measure of volatility is tantamount to estimation of the proportion of packet switching calls in all the calls.

Figure 5:
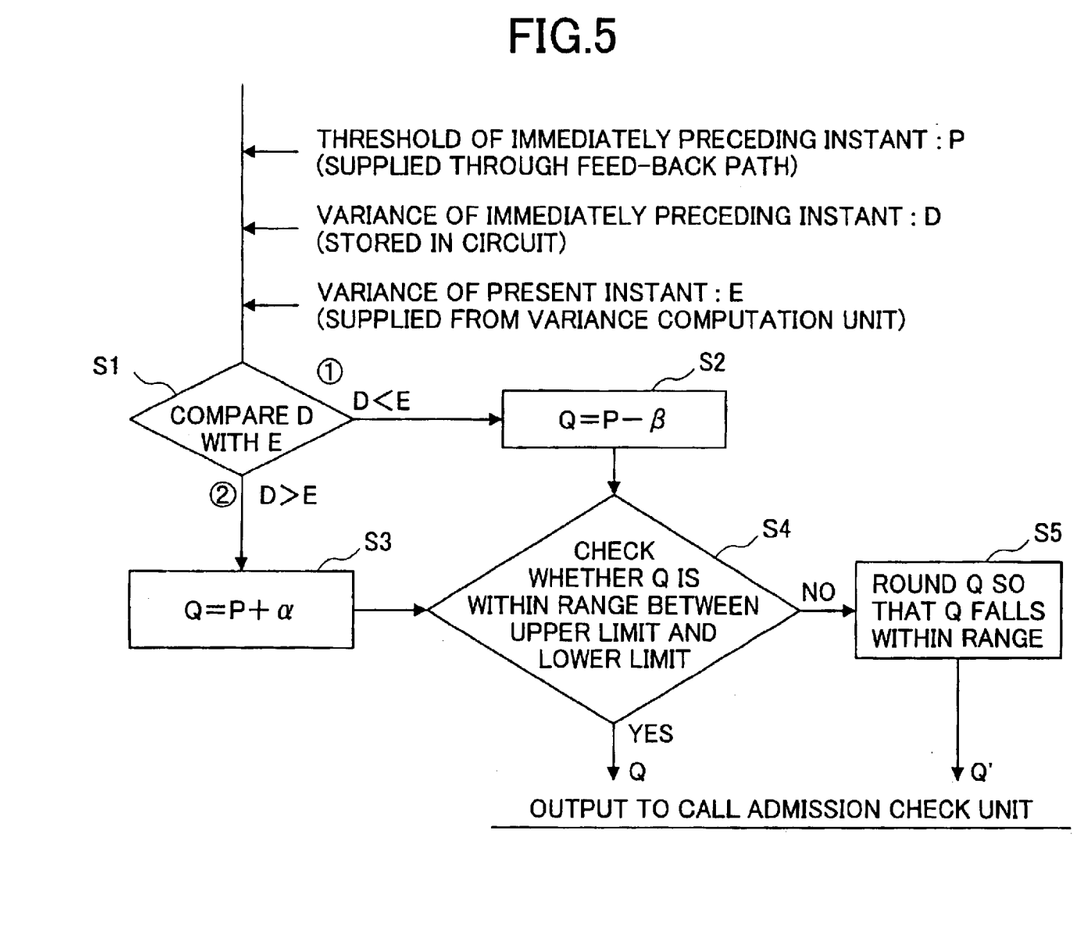
FIG. 5 is a flowchart showing a method of computing a threshold by a threshold computation unit.

FIG. 5 is a flowchart showing a method of computing a threshold by the threshold computation unit 25-4.

In FIG. 5, the threshold computation unit 25-4 computes a threshold of the present instant based on a threshold P of a previous instant, a variance D of a previous instant, and a variance E of the present instant. For example, the variance D of the previous instant is compared with the variance E of the present (S1). If the variance E of the present is larger than the variance D of the previous instant (D<E at S1), the variance has increased from the previous instant so that the presence of potential packet switching call is expected. In this case, therefore, the call admission threshold Q is lowered. In this example, a process at step S2 subtracts β from the threshold P of the previous instant. Through this subtraction, the call admission threshold Q is lowered. If the variance E of the present instant is smaller than the variance D of the previous instant (D>E at S1), it is fair to assume that circuit switching calls are predominant, with the number of potential packet switching calls being relatively small. In this case, therefore, the call admission threshold Q is raised. In this example, a process at step S3 adds α to the threshold P of the previous instant. Through this addition, the call admission threshold Q is raised.

The threshold Q as computed above is checked as to whether the computed threshold Q falls within a predetermined tolerance range (S4). If the computed threshold Q falls within the tolerance range (YES at S4), this threshold Q is used as a threshold. If the computed threshold Q falls outside the tolerance range (NO at S4), a rounding process is performed to place the threshold Q within the tolerance range (S5), thereby generating a threshold Q'. The threshold Q or Q' is supplied to the call admission check unit 25-1.

The method of computing the threshold Q as described above is only an example, and other methods may be used for the computation of the threshold Q. For example, a table that lists variances and optimum thresholds is obtained in advance through experimentation, and is referred to in order to determine a new threshold. In this case, the call admission control unit 25 may read and refer to the table from the memory unit 26. Alternatively, the base station transmission power may be assumed to have a normal distribution. A test such as a one-sided test is then applied to an average and variance of the base station transmission power, and a threshold is set such that the possibility of the base station transmission power exceeding X % is adjusted to Y %. Further, the computation methods described here may be combined to compute the threshold Q.

As described above, the threshold is dynamically updated based on the variances. The updating of a threshold is an increase or a decrease depending on whether a variance is larger than a preceding variance. That is, the updating of a threshold is performed by taking into consideration the types of calls connected to the base station 20. Because of such consideration, use of this threshold for the call admission check achieves appropriate call admission Since the threshold is updated constantly, call admission control that is accurate in real-time can be achieved.

Figure 6:
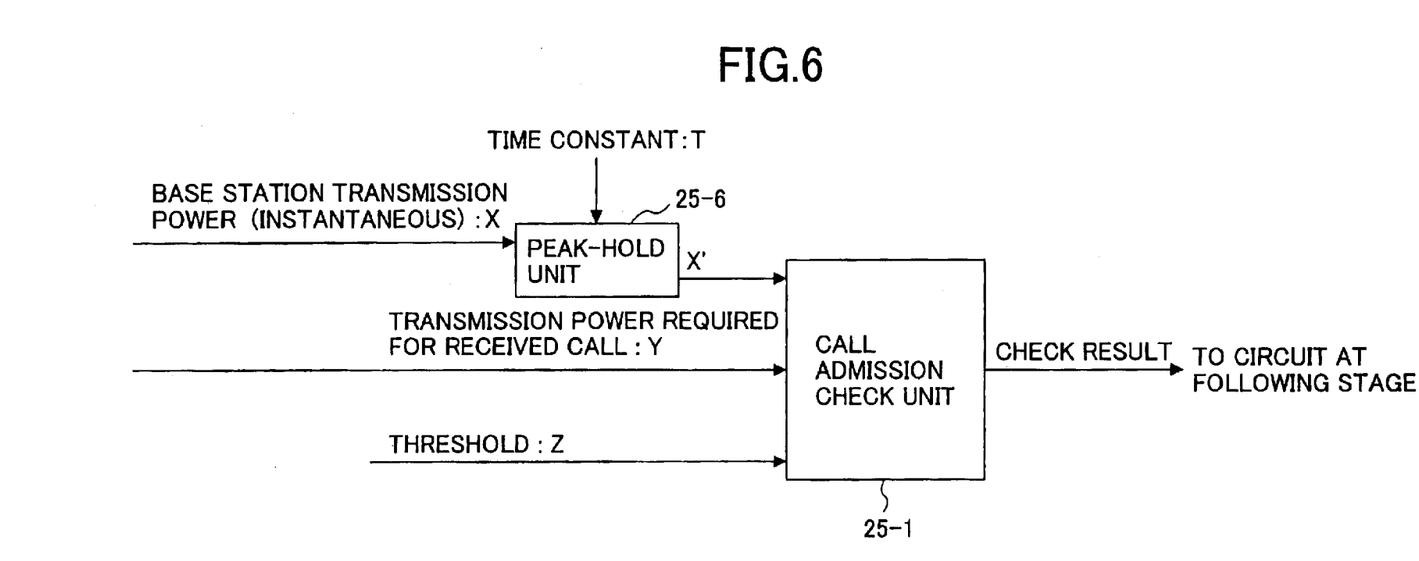
FIG. 6 is a block diagram showing another example configuration of the call admission control unit.

FIG. 6 is a block diagram showing another example configuration of the call admission control unit 25.

In FIG. 6, the call admission control unit 25 includes a peak-hold unit 25-6 in addition to the call admission check unit 25-1 where the peak-hold unit 25-6 outputs a maximum value of instantaneous values of the base station transmission power. The peak-hold unit 25-6 is provided with a time constant T as an operation parameter.

In the following, a third embodiment of the present invention will be described with reference to FIG. 6.

In FIG. 6, the peak-hold unit 25-6 finds the largest of the instantaneous samples of the base station transmission power during the past time period T, and supplies the largest sample to the call admission check unit 25-1. In this manner, the call admission check unit 25-1 receives a peak of base station transmission power over the past time period T, and this peak will be significantly larger than the average of base station transmission power if the number of packet switching calls is large. This can avoid a situation in which the base station transmission power becomes insufficient after accepting a received call. If circuit switching calls are predominant, the peak will not be much different from the average, so that substantially the same operation as the first embodiment is performed.

In this manner, use of the peak-hold unit 25-6 makes it possible to automatically determine whether the circuit switching calls are predominant or the packet switching calls are predominant, thereby achieving efficient call admission control.

Figure 7:
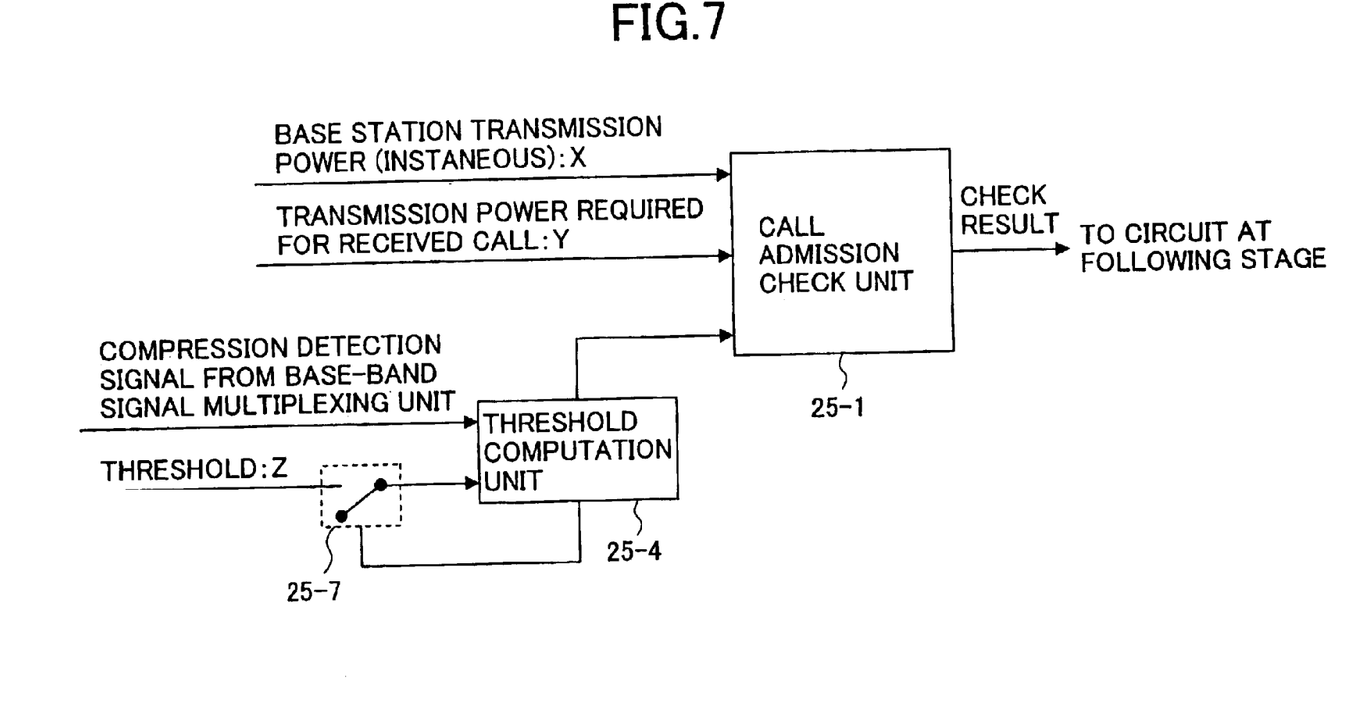
FIG. 7 is a block diagram showing another example configuration of the call admission control unit.

FIG. 7 is a block diagram showing another example configuration of the call admission control unit 25.

In FIG. 7, the call admission control unit 25 includes the call admission check unit 25-1 and the threshold computation unit 25-4. Further, the threshold computation unit 25-4 can switch between a line carrying an initial threshold and a line that feeds back a threshold computed by the threshold computation unit 25-4. This switching is carried out by a switch unit 25-7. In this embodiment, the threshold computation unit 25-4 further receives a compression detection signal from the base-band signal multiplexing unit 27.

In the following, a fourth embodiment of the present invention will be described with reference to FIG. 7.

The threshold computation unit 25-4 receives a signal from the base-band signal multiplexing unit 27. This signal indicates the presence/absence of compression that is detected by the base-band signal multiplexing unit 27. If this signal indicates the presence of compression, the threshold computation unit 25-4 raises the threshold. On the other hand, if the threshold computation unit 25-4 does not detect a signal indicative of the presence of compression for a predetermined time period, the threshold computation unit 25-4 lowers the threshold. The threshold obtained in this manner is then supplied to the call admission check unit 25-1.

The fact that the threshold computation unit 25-4 detects a signal indicative of the presence of compression means that the base station transmission power has reached its limit. In this case, the threshold is raised in order not to accept further calls in addition to the currently connected calls. If the threshold computation unit 25-4 does not detect a signal indicative of the presence of compression, this means that the transmission power of the base station 20 has not yet reached its limit. In this case, the threshold computation unit 25-4 lowers the threshold so that it is more likely to accept calls.

Figure 8:
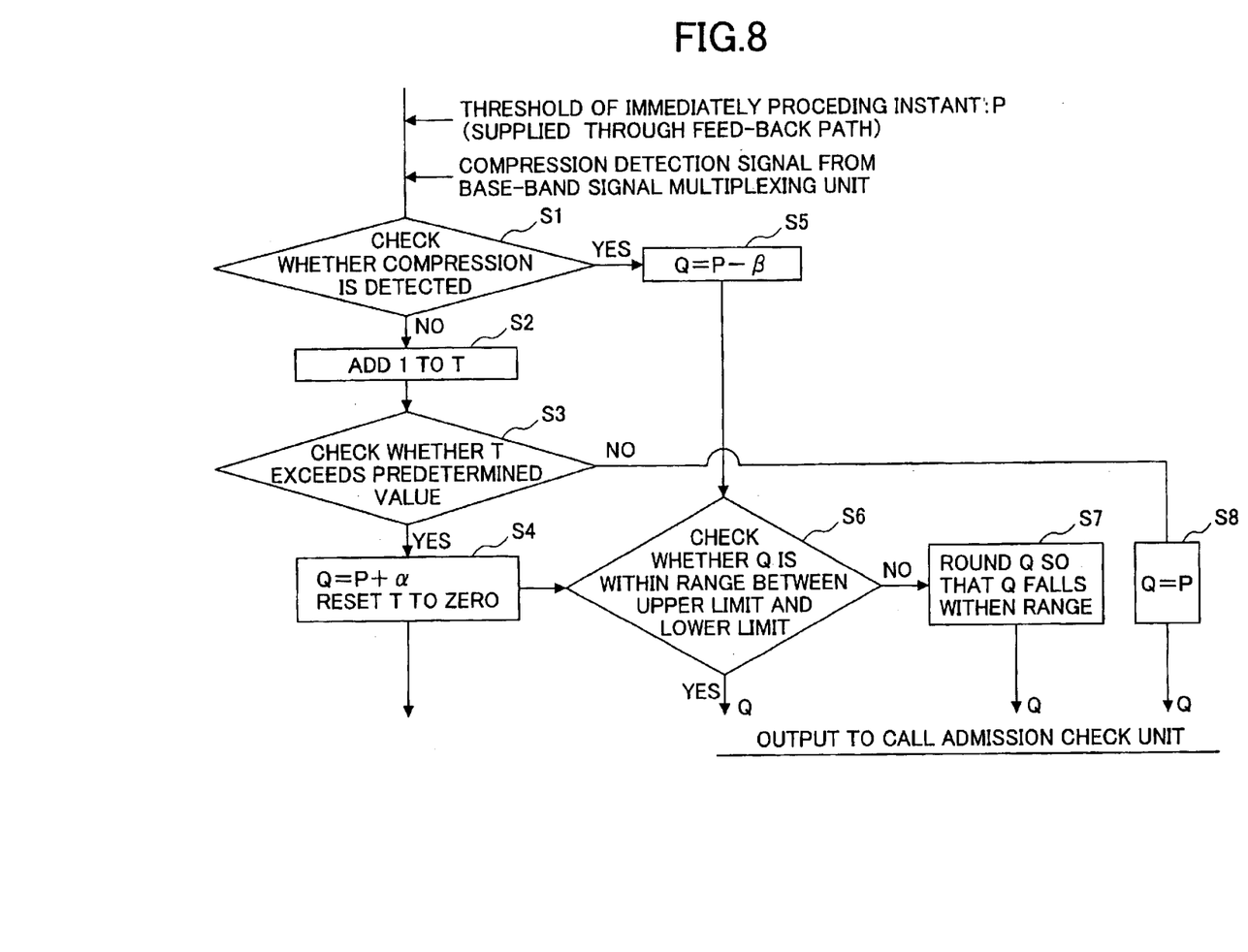
FIG. 8 is a flowchart showing a method of computing a threshold by the threshold computation unit.

In the following, a method of computing a threshold by the threshold computation unit 25-4 according to the fourth embodiment will be described.

FIG. 8 is a flowchart showing a method of computing a threshold by the threshold computation unit 25-4.

In FIG. 8, the threshold computation unit 25-4 receives a threshold P of a previous instant and a compression detection signal from the baseband signal multiplexing unit 27. If the compression detection signal from the base-band signal multiplexing unit 27 indicates the presence of detection (YES at S1), the threshold computation unit 25-4 decreases the threshold P of the previous instant by a predetermined amount $\beta$ (S8), thereby producing a new threshold Q. If the compression detection signal from the base-band signal multiplexing unit 27 does not indicate the presence of compression (NO at S1), a time at which this compression detection signal has arrived is marked as a start of a time T, and this time T is incremented by a predetermined amount such as "1" (S2). A check is then made as to whether the time T exceeds a predetermined value (S3). If the time T exceeds the predetermined value (YES at S3), a predetermined amount $\alpha$ is added to the threshold P of the previous instant, and T is reset to zero.

The threshold Q as computed at step S5 or step S4 is checked as to whether the computed threshold Q falls within a predetermined tolerance range (S6). If the computed threshold Q falls within the tolerance range (YES at S6), this threshold Q is used as a threshold. If the computed threshold Q falls outside the tolerance range (NO at S6), a rounding process is performed to place the threshold Q within the tolerance range (S7), thereby generating a threshold Q'. The threshold Q or Q' is supplied to the call admission check unit 25-1.

In this embodiment described above, the threshold is increased or decreased depending on the presence/absence of compression detected by the base-band signal multiplexing unit 27. Namely, this embodiment can estimate the condition of calls currently connected to the base station 20 by detecting the presence/absence of compression in the base-band signal multiplexing unit 27.

The present invention has been described with reference to the four embodiments. The call admission control unit 25 of the present invention may be implemented by combining any of these embodiments. For example, the call admission control unit 25 may be configured such that a call is not admitted unless both the determination made by the first embodiment criteria and the determination made by the second embodiment criteria indicate admission of a call.

Further, the present invention is not limited to these embodiments, but various variations and modifications may be made without departing from the scope of the present invention.

The present application is based on Japanese priority application No. 2001-034304 filed on Feb. 9, 2001, with the Japanese Patent Office, the entire contents of which are hereby incorporated by reference.

What is claimed is:

1. An apparatus for controlling call admission, comprising:
   a call admission check unit which determines whether to admit a call in response to reception of the call based on a threshold, the determination being made by comparing a value associated with past samples of base station transmission power with the threshold while taking into account transmission power required for the call.

2. The apparatus as claimed in claim 1, further comprising an averaging unit which obtains an average of past samples of the base station transmission power, wherein said call admission check unit determines whether to admit the call by comparing the threshold with a sum of the average of past samples and transmission power required for the call.

3. The apparatus as claimed in claim 1, further comprising an averaging unit which obtains a median of past samples of the base station transmission power, wherein said call admission check unit determines whether to admit the call by comparing the threshold with a sum of the median of past samples and transmission power required for the call.

4. The apparatus as claimed in claim 2, further comprising a packet-switching-call-proportion estimating unit which estimates a proportion of packet switching calls in a total number of calls based on past samples of the base station transmission power, wherein the threshold reflects the estimated proportion.

5. The apparatus as claimed in claim 4, wherein said packet-switching-call-proportion estimating unit measures a volatility of the base station transmission power as the estimated proportion over a predetermined time period.

6. The apparatus as claimed in claim 5, wherein said packet-switching-call-proportion estimating unit obtains a variance as a measure of said volatility.

7. The apparatus as claimed in claim 5, further comprising a threshold computation unit which computes the threshold concerning a present instant based on the average of past samples, the measured volatility, and the threshold concerning a previous instant.

8. The apparatus as claimed in claim 5, further comprising a threshold computation unit which computes the threshold concerning a present instant by adjusting the threshold concerning a previous instant in response to the measured volatility and by placing the threshold concerning the present instant within a tolerance range if the threshold concerning the present instant falls outside a tolerance range.

9. The apparatus as claimed in claim 5, further comprising:
- a memory unit which stores therein a table of volatilities and associated thresholds; and
- a threshold computation unit which obtains the threshold by referring to the table and finding in the table a threshold associated with the volatility measured by said packet-switching-call-proportion estimating unit.

10. The apparatus as claimed in claim 5, further comprising
- a threshold computation unit which determines the threshold by performing a statistical test based on the average obtained by averaging unit and the volatility measured by said packet-switching-call-proportion estimating unit, such that a possibility of the base station transmission power exceeding a first predetermined percentage is adjusted to a second predetermined percentage.

11. The apparatus as claimed in claim 2, further comprising
- a threshold computation unit which determines the threshold concerning a present instant by adjusting the threshold concerning a previous instant in response to whether compression is present or absent in multiplexing base-band signals.

12. The apparatus as claimed in claim 1, further comprising
- a peak-hold unit which obtains a peak of the base station transmission power within a predetermined period, wherein said call admission check unit determines whether to admit the call by comparing the threshold with a sum of the peak and transmission power required for the call.

13. A base station which checks admission of received calls for providing communication services to a plurality of users, comprising a call admission check unit which determines whether to admit a call in response to reception of the call based on a threshold, the determination being made by comparing a value associated with past samples of base station transmission power with the threshold while taking into account transmission power required for the call.

* * * * *